(12) United States Patent
Inoue et al.

(10) Patent No.: US 9,428,642 B2
(45) Date of Patent: Aug. 30, 2016

(54) MOLDING MATERIAL FOR SLIDING MEMBER, AND SLIDING MEMBER

(71) Applicant: ASAHI ORGANIC CHEMICALS INDUSTRY CO., LTD., Miyazaki (JP)

(72) Inventors: Takanori Inoue, Niwa-gun (JP); Keiji Asai, Inuyama-shi (JP)

(73) Assignee: Asahi Organic Chemicals Industry Co., Ltd., Miyazaki (JP)

(*) Notice: Subject to any disclaimer, the term of this patent is extended or adjusted under 35 U.S.C. 154(b) by 0 days.

(21) Appl. No.: 14/420,526

(22) PCT Filed: Aug. 8, 2013

(86) PCT No.: PCT/JP2013/071553
§ 371 (c)(1),
(2) Date: Feb. 9, 2015

(87) PCT Pub. No.: WO2014/024992
PCT Pub. Date: Feb. 13, 2014

(65) Prior Publication Data
US 2015/0232659 A1    Aug. 20, 2015

(30) Foreign Application Priority Data

Aug. 10, 2012    (JP) ................. 2012-179033

(51) Int. Cl.
*C08L 65/02*    (2006.01)
*C08L 9/02*    (2006.01)

(52) U.S. Cl.
CPC . *C08L 65/02* (2013.01); *C08L 9/02* (2013.01)

(58) Field of Classification Search
CPC ......... C08L 61/06; C08L 83/04; C08L 75/04
USPC ........................................... 524/405
See application file for complete search history.

(56) References Cited

FOREIGN PATENT DOCUMENTS

| JP | 61-127662 | | 6/1986 | |
|---|---|---|---|---|
| JP | 63-241060 | * | 10/1988 | ............... C08L 61/06 |
| JP | 8-176401 | | 7/1996 | |
| JP | 09-087533 | | 3/1997 | |
| JP | 2000-026839 | | 1/2000 | |
| JP | 2003-041092 | | 2/2003 | |
| JP | 2005-120122 | | 5/2005 | |
| JP | 2005-247908 | | 9/2005 | |
| JP | 2006-117815 | | 5/2006 | |
| JP | 2006-316854 | * | 11/2006 | ............... C08K 3/00 |
| JP | 2006-328215 | | 12/2006 | |
| JP | 2010-037351 | | 2/2010 | |
| JP | 2011-089095 | | 5/2011 | |
| JP | 2011-116956 | * | 6/2011 | ............. C08K 61/06 |
| JP | 2011-173970 | * | 9/2011 | ............. C08L 61/10 |
| WO | WO-2011/052127 | | 5/2011 | |

* cited by examiner

*Primary Examiner* — Ling Choi
*Assistant Examiner* — Chun-Cheng Wang
(74) *Attorney, Agent, or Firm* — Norris McLaughlin & Marcus, P.A.

(57) ABSTRACT

A molding material for a sliding member, the molding material being superior in processability and sliding properties, and a sliding member formed from the molding material for a sliding member are provided. The molding material for a sliding member contains a phenol resin, a boron compound, an elastomer and a filler. The elastomer preferably contains at least one selected from the group consisting of are acrylonitrile butadiene rubber, a urethane rubber and a silicone rubber, and more preferably an acrylonitrile butadiene rubber among them. The boron compound preferably contains at least one selected from the group consisting of boric acid, zinc borate and boron oxide, and the filler preferably contains a carbon fiber. Furthermore, the content of the elastomer with respect to 100 parts by mass of the carbon fiber is preferably no less than 5 parts by mass and no greater than 50 parts by mass.

6 Claims, No Drawings

MOLDING MATERIAL FOR SLIDING MEMBER, AND SLIDING MEMBER

TECHNICAL FIELD

The present invention relates to a molding material for a sliding member, and a sliding member.

BACKGROUND ART OF THE INVENTION

Conventionally, metal sliding members have been intensively used in industrial equipment, office equipment, transportation equipment, and the like. In recent years, however, to meet demands for reduction in size, cost and weight, etc., there is a trend toward the replacement of the metal sliding members with resin sliding members. Of these, certain resin sliding members are formed from a phenol resin molding material that contains a phenol resin as a base material, and the phenol resin molding material exhibits superior harmony of heat resistance, dimensional accuracy, a cost and a reduction in weight.

On the other hand, in these days, sliding parts for automobile components, office automation (OA) instruments and the like are required to exhibit further superior sliding properties to such an extent that: the sliding parts themselves and a counter-member thereof minimally wear even in sliding under conditions involving heavy loads, high revolutions, high temperatures; etc. To meet the demands described above, for example, a phenol resin molding material has been proposed in which a glass fiber and a wax are blended into a phenol resin (see Japanese Unexamined Patent Application, Publication No. 2006-328215).

However, it is still necessary to improve the processability and sliding properties of the aforementioned conventional phenol resin molding material, due to the liability to: chipping in the processing thereof; wearing when employed as a sliding member, depending on the type of a counter-member; and other events.

PRIOR ART DOCUMENT

Patent Document 1: Japanese Unexamined Patent Application, Publication No. 2006-328215

SUMMARY OF THE INVENTION

The present invention was made in view of the foregoing circumstances, and an object of the present invention is to provide a molding material for a sliding member, the molding material being superior in processability and sliding properties, and a sliding member formed from the molding material for a sliding member.

According to an aspect of the invention made for solving the aforementioned problems, a molding material for a sliding member contains a phenol resin, a boron compound, an elastomer and a filler.

The molding material for a sliding member according to the aspect of the present invention contains the boron compound, the elastomer and the filler in addition to the phenol resin that serves as a base material. Thus, the molding material for a sliding member can exhibit superior sliding properties irrespective of whether a counter-member is formed from a hard material such as carbon steel or a soft material such as aluminum. In this regard, it is presumed that since the elastomer is contained, a frictional influence on the counter-member would be suppressed. Moreover, since the elastomer is thus contained, the modulus of elasticity can be decreased, and as a result, occurrence of defects such as chipping can be inhibited in the molding of a sliding member from the molding material for a sliding member. In addition, according to the molding material for a sliding member, since the boron compound is contained, the wear amount can be reduced. Furthermore, since the filler is contained, the frictional coefficient can be decreased. Accordingly, the molding material for a sliding member exhibits superior processability and sliding properties.

The elastomer preferably includes at least one selected from the group consisting of an acrylonitrile butadiene rubber, a urethane rubber and a silicone rubber. When the elastomer thus includes the above-specified component(s), the modulus of elasticity can be further decreased. As a result, occurrence of defects such as chipping can be further inhibited in the molding of a sliding member from the molding material for a sliding member, leading to a further improvement of processability.

The elastomer preferably includes an acrylonitrile butadiene rubber. When the acrylonitrile butadiene rubber is thus selected as the elastomer, the modulus of elasticity can be decreased without an impairment of the sliding properties. As a result, processability can be improved, while the superior sliding properties are maintained.

The boron compound preferably includes at least one selected from the group consisting of boric acid, zinc borate and boron oxide. When the boron compound thus includes the specific component(s), a wear amount in the sliding can be further reduced. As a result, the sliding properties of the molding material for a sliding member can be improved.

The filler preferably includes a carbon fiber. When the filler thus includes the carbon fiber, the frictional coefficient can be further decreased. As a result, the sliding properties of the molding material for a sliding member can be further improved.

The content of the elastomer with respect to 100 parts by mass of the carbon fiber is preferably no less than 5 parts by mass and no greater than 50 parts by mass. When the content of the elastomer with respect to 100 parts by mass of the carbon fiber is thus no less than 5 parts by mass and no greater than 50 parts by mass, the processability and the sliding properties can be exhibited in a well-harmonized manner.

It is preferred that the total content of a phenolic monomer and a phenolic dimer in the phenol resin is no greater than 10% by mass, and that the dispersity ratio (Mw/Mn) of the weight average molecular weight (Mw) to the number average molecular weight (Mn) of the phenol resin is no less than 1.1 and no greater than 3.0. When the total content of the phenolic monomer and the phenolic dimer in the phenol resin, and the dispersity ratio (Mw/Mn) thus fall within the respective ranges described above, the frictional coefficient of the molding material for a sliding member can be decreased, and the wear amount can be reduced.

According to another aspect of the present invention, a sliding member formed from the molding material for a sliding member is also provided. Due to being formed from the molding material for a sliding member, the sliding member exhibits superior processability and sliding properties, as described above. Accordingly, the sliding member can be suitably used as a sliding part in automobile components, OA instruments and the like. Specific examples of the resin sliding part include, but are not limited to, thrust washers, pulleys, bearings, gears, toothed wheels, pump parts, swash plates, and the like.

As explained in the foregoing, the molding material for a sliding member according to the aspect of the present invention exhibits superior processability and sliding properties. Moreover, the sliding member according to the another aspect of the present invention is formed from the molding material for a sliding member according to the aspect of the present invention, and exhibits superior processability and sliding properties; therefore, the sliding member can be suitably used as a sliding part.

DESCRIPTION OF THE PREFERRED EMBODIMENTS

Hereinafter, the molding material for a sliding member and the sliding member formed from the molding material for a sliding member according to embodiments of the present invention will be described in detail.

Molding Material for Sliding Member

The molding material for a sliding member according to an embodiment of the present invention is obtained by incorporating a boron compound, an elastomer and a filler into a phenol resin.

Phenol Resin

The phenol resin is not particularly limited as long as a phenol resin that is conventionally used as a material for a sliding member is employed. Such a phenol resin is exemplified by a novolak-type phenol resin, a resol-type phenol resin, and the like. Of these, a novolak-type phenol resin is preferred in light of a reduced wear amount and a great PV value. Moreover, the resol-type phenol resin is exemplified by a methylol-type phenol resin, a dimethylene ether-type phenol resin, and the like. Of these, a dimethylene ether-type phenol resin is preferred in light of the unlikelihood of the occurrence of chipping in the processing thereof. These phenol resins may be either solid or liquid. In addition, these phenol resins may be used either alone of one type, or two or more types thereof may be used in combination.

The number average molecular weight (Mn) of the phenol resin is preferably no less than 400 and no greater than 1,200, and more preferably no less than 600 and no greater than 1,000. When the number average molecular weight of the phenol resin falls within the above range, the heat shock resistance can be improved.

The weight average molecular weight (Mw) of the phenol resin is preferably no less than 400 and no greater than 5,000, and more preferably no less than 1,000 and no greater than 4,000. When the weight average molecular weight of the phenol resin falls within the above range, the stability and the moldability can be improved.

According to the phenol resin, the total content of a phenolic monomer and a phenolic dimer is preferably no greater than 10% by mass, and more preferably no greater than 5% by mass. When the total content of the phenolic monomer and the phenolic dimer in the phenol resin falls within the above range, the frictional coefficient can be decreased, whereby the wear amount can be reduced. Moreover, when the aforementioned total content falls within the above range, the heat resistance and the dimensional accuracy can be improved. It is to be noted that the total content of the phenolic monomer and the phenolic dimer in the phenol resin may be 0% by mass. The total content is determined by an area method based on gel filtration chromatography.

According to the phenol resin, the dispersity ratio (Mw/Mn) of the weight average molecular weight (Mw) to the number average molecular weight (Mn) is preferably no less than 1.1 and no greater than 3.0, and more preferably no less than 1.1 and no greater than 2.8. When the dispersity ratio (Mw/Mn) of the phenol resin falls within the above range, the stability and the moldability of the molding material for a sliding member can be improved, leading to an improvement of the heat resistance and the dimensional accuracy. It is to be noted that the dispersity ratio (Mw/Mn) mentioned above is determined by gel filtration chromatography.

Above all, it is particularly preferred that the total content of a phenolic monomer and a phenolic dimer in the phenol, resin is no greater than 10% by mass, and that the dispersity ratio (Mw/Mn) of the phenol resin is no less than 1.1 and no greater than 3.0. When the total content of the phenolic monomer and the phenolic dimer and the dispersity ratio (Mw/Mn) concurrently thus fall within the respective ranges described above, the frictional coefficient of the molding material for a sliding member can be decreased, whereby the wear amount can be further reduced. In addition, when the total content and the dispersity ratio concurrently fall within the respective ranges, the melt viscosity remains low even when the total content of the phenolic monomer and the phenolic dimer is no greater than 10% by mass. Accordingly, a component that is subject to aggregation, e.g., elastomers, can also be homogeneously dispersed, leading to easy formation of a uniform and fine sea-island structure. As a result, a loss of the elastomer component due to friction can be reduced while the modulus of elasticity is appropriately decreased, leading to a remarkable improvement of wear resistance.

Boron Compound

The boron compound is exemplified by boric acid, a boric acid salt, a boric acid ester, boron oxide, borax, and the like. Examples of the boric acid salt include metal salts of metaboric acid, tetraboric acid and the like, and specific examples thereof include zinc borate and the like. Of these, boric acid, a boric acid salt and boron oxide are preferred, and boric acid, zinc borate and boron oxide are more preferred. These boron compounds may be used either alone of one type, or two or more types thereof may be used in combination.

The content of the boron compound with respect to 100 parts by mass of the phenol resin is preferably no less than 0.5 parts by mass and no greater than 10 parts by mass, and more preferably no less than 1.0 part by mass and no greater than 7.0 parts by mass. When the content of the boron compound is less than the lower limit, the wear amount may be increased, and sliding properties such as the frictional coefficient may be deteriorated. On the other hand, when the content of the boron compound is greater than the upper limit, the mechanical strength may be impaired.

Elastomer

Examples of the elastomer include an acrylonitrile butadiene rubber (NBR), a urethane rubber, a styrene-butadiene rubber (SBR), an acrylic rubber, a silicone rubber, polybutadiene, and the like. Of these, an acrylonitrile butadiene rubber (NBR), a urethane rubber and a silicone rubber are preferred in light of the possibility of effectively decreasing the modulus of elasticity of the molding material for a sliding member, and an acrylonitrile butadiene rubber (NBR) is more preferred in light of the possibility of decreasing the modulus of elasticity without an impairment of the sliding properties. These elastomers may be used either alone of one type, or two or more types thereof may be used in combination.

The content of the elastomer with respect to 100 parts by mass of the phenol resin is preferably no less than 1 part by mass and no greater than 50 parts by mass, and more preferably no less than 2 parts by mass and no greater than 30 parts by mass. When the content of the elastomer is no less than the lower limit, aggressiveness to a counter-member can be suppressed, leading to a reduction of the wear amount. On the other hand, when the content of the elastomer is no greater than the upper limit, deterioration of creep performances due to a decrease of the modulus of elasticity can be suppressed.

Filler

The filler is exemplified by a carbon material, calcium carbonate, clay, talc, silica, alumina, a glass fiber, an aramid fiber, and the like. Of these, the carbon material is preferred. Examples of the carbon material include graphite (black lead), a carbon fiber, and the like, and it is particularly preferred that graphite (black lead) and the carbon fiber are contained together. When graphite (black lead) and the carbon fiber are thus contained together, the wear amount of the molding material for a sliding member can be reduced, and the sliding properties such as the frictional coefficient can be improved. These fillers may be used either alone of one type, or two or more types thereof may be used in combination.

Moreover, in the case of the use of the carbon fiber as the filler, although the average length of the carbon fiber contained in the molding material for a sliding member is not particularly limited, the average length of the carbon fiber is preferably no less than 0.01 mm and no greater than 1 mm, more preferably no less than 0.05 mm and no greater than 0.75 mm, and still more preferably no less than 0.1 mm and no greater than 0.5 mm. When the average length of the carbon fiber is less than the lower limit, the mechanical strength of the molding material for a sliding member may be impaired. On the other hand, when the average length of the carbon fiber is greater than the upper limit, the carbon fiber is likely to be easily peeled off in the sliding, leading to deterioration of the sliding properties. It is to be noted that the average length as referred to means an average of the major axis of the carbon fiber.

The content of the filler with respect to 100 parts by mass of the phenol resin is preferably no less than 50 parts by mass and no greater than 400 parts by mass, more preferably no less than 80 parts by mass and no greater than 250 parts by mass, and still more preferably no less than 100 parts by mass and no greater than 200 parts by mass. When the content of the filler is less than the lower limit, the frictional coefficient may be increased, leading to an increase of the wear amount. On the other hand, when the content of the filler is greater than the upper limit, the flow performances of the molding material for a sliding member may be impaired, leading to deterioration of the moldability.

Moreover, in the case of the use of the carbon fiber as the filler, the elastomer is contained in an amount of preferably no less than 5 parts by mass and no greater than 50 parts by mass, and more preferably no less than 10 parts by mass and no greater than 30 parts by mass with respect to 100 parts by mass of the carbon fiber. When the elastomer is thus blended in an amount not less than the lower limit with respect to 100 parts by mass of the carbon fiber, the modulus of elasticity appropriately may be decreased, whereby occurrence of defects such as chipping can be further inhibited in the processing. Moreover, when the elastomer is blended in an amount not greater than the upper limit, the deterioration of the creep performances due to an excessive decrease of the modulus of elasticity can be further suppressed. Moreover, when the elastomer is blend in an amount falling within the above range with respect to 100 parts by mass of the carbon fiber, superior sliding properties can be exhibited irrespective of whether a counter-member is formed from a hard material such as carbon steel or a soft material such as aluminum.

Other Additive

The molding material for a sliding member may contain other additive, within a range not leading to an impairment of the effects of the present invention. The other additive is exemplified by a curing agent (for example, hexamethylenetetramine and the like), a release agent (for example, calcium stearate, zinc stearate and the like), a curing accelerator (magnesium oxide, slaked lime, and the like), a coupling agent, a solvent, and the like. These additives may be used either alone of one type, or two or more types thereof may be used in combination.

Production Method of Molding Material for Sliding Member

Well-known various methods may be employed as a method for production of the molding material for a sliding member. Specifically, the molding material for a sliding member can be produced, for example, by heat melting the above-mentioned various types of components with a compression kneader, a mixing roll, a twin-screw extruder or the like, kneading the components, then molding the resulting kneaded product into a sheet-form material, and further crushing the molded sheet-form material using a pelletizing machine, a power mill or the like.

Sliding Member

The sliding member according to another embodiment of the present invention is formed from the molding material for a sliding member according to the embodiment of the present invention, and therefore exhibits superior processability and sliding properties. In particular, the sliding member can exhibit superior sliding properties irrespective of whether a counter-member is formed from a hard material such as carbon steel or a soft material such as aluminum, and therefore can be suitably used as, for example: sliding parts for automobiles such as thrust washers, pulleys, bearings, gears, toothed wheels, pump parts and swash plates; sliding parts for OA instruments; or the like.

Production Method of Sliding Member

The sliding member can be produced by molding the molding material for a sliding member through a process such as, for example, injection molding, transfer molding and compression molding.

The molding conditions are not particularly limited. For example, the temperature for kneading on a roller may be no less than about 70° C. and no greater than about 90° C.; in the injection molding, the temperature of the cylinder may be no less than about 70° C. and no greater than about 100° C. at the anterior part, and no less than about 30° C. and no greater than about 50° C. at the rear part; and the temperature of a die (curing temperature) may be no less than about 160° C. and no greater than about 180° C.

The molded product obtained after the molding is preferably subjected to post-curing. When the post-curing is applied, the sliding properties of the sliding member can be improved. The post-curing is preferably carried out, for example, at a temperature of no less than about 150° C. and no greater than about 230° C. for a time period of no less than about 3 hrs and no greater than about 24 hrs.

EXAMPLES

Hereinafter, the present invention will be described in more detail by way of Examples, but the present invention is not limited by these Examples. It is to be noted that the terms "part(s)" and "%" used in Examples indicate "part(s) by mass" and "% by mass", respectively, unless otherwise specified particularly. Moreover, when the blend amount is referred to herein in terms of part(s) by mass, the blend amount is described in terms of part(s) by mass with respect to 100 parts by mass of the phenol resin.

Production of Novolak-Type Phenol Resin (1)

Into a reaction vessel equipped with a thermometer, a stirrer and a condenser were charged 193 parts of phenol (P), 57 parts of 92% paraformaldehyde (F) (molar ratio: F/P=0.85), 116 parts (60%/P) of 89% phosphoric acid and 96.5 parts (50%/P) of ethylene glycol, and were mixed by stirring. Then, the temperature of the mixture in a state of being turbid (a biphasic mixture) attained by the stirring and mixing was gradually elevated to the reflux temperature of the mixture, and a condensation reaction was further allowed to proceed at the same temperature for 10 hrs. After the termination of the reaction, methyl isobutyl ketone was added to the reaction mixture with stirring and mixing to dissolve the condensation product. Thereafter, the stirring and mixing was stopped, and the content was transferred to a separatory flask and then left to stand, whereby the methyl isobutyl ketone solution layer (upper layer) was separated from the aqueous phosphoric acid solution layer (lower layer). Then, the aqueous phosphoric acid solution layer was discarded, and the methyl isobutyl ketone solution was washed several times with water to remove phosphoric acid. Thereafter, the content was transferred to the reaction vessel, and methyl isobutyl ketone was completely removed through vacuum distillation to obtain 213.5 parts of a novolak-type phenol resin (1). The novolak-type phenol resin (1) had a number average molecular weight of 755 and a dispersity ratio of 1.63.

Production of Novolak-Type Phenol Resin (2)

Into a reaction vessel equipped with a thermometer, a stirrer and a condenser were charged 193 parts of phenol, 142 parts (F/P:=0.85) of 37% by mass formalin and 0.97 parts (0.5%/P) of oxalic acid. Thereafter, the temperature of the mixture was gradually elevated to the reflux temperature of the mixture (98 to 102° C.), and a condensation reaction was allowed to proceed at the same temperature for 6 hrs. Then, vacuum concentration was carried out to obtain 1.99 parts (yield: 103%/P) of a novolak-type phenol resin (2). The phenol resin had a number average molecular weight of 512 and a dispersity ratio of 7.5.

Properties of Novolak-Type Phenol Resins

Properties of the novolak-type phenol resins (1) and (2) obtained in Production Examples described above were determined in accordance with the following test methods. The results obtained are shown in Table 1. It is to be noted that the dispersity ratio, the content of the phenolic monomer and the content of the phenolic direr each shown in Table 1 were obtained in accordance with the following measuring methods.

Dispersity Ratio

A weight average molecular weight (Mw) and a number average molecular weight (Mn) in terms of standard polystyrene equivalent were determined on a gel filtration chromatography SC-8020 series build-up system (columns: G2000Hxl+G4000Hxl; detector: UV 254 nm; carrier: tetrahydrofuran, 1 mL/min; and column temperature: 38° C.) manufactured by Tosoh Corporation, and the dispersity ratio (Mw/Mn) was calculated.

Content of Phenolic Monomer and Phenolic Dimer

The contents of the phenolic monomer and the phenolic dimer were determined in accordance with an area method in which an area corresponding to the phenolic monomer and an area corresponding to the phenolic dimer with respect to the total area under the molecular weight distribution curve are displayed in percentage terms.

TABLE 1

|  | Novolak-type phenol resin (1) | Novolak-type phenol resin (2) |
| --- | --- | --- |
| Number average molecular weight (Mn) | 755 | 512 |
| Weight average molecular weight (Mw) | 1227 | 3842 |
| Dispersity ratio (Mw/Mn) | 1.63 | 7.5 |
| Content of phenolic monomer (%) | 0.3 | 9.1 |
| Content of phenolic dimer (%) | 3.3 | 8.4 |

Example 1

As shown in Table 2 below, 100 parts by mass of the novolak-type phenol resin (1), 100 parts by mass of graphite (black lead) (manufactured by Nippon Denko Co., Ltd.), 50 parts by mass of a carbon fiber ("TA008A" manufactured by Toray Industries, Inc.; fiber length: 3 mm), 3 parts by mass of boric acid (manufactured by Nippon Denko Co., Ltd.), 7.5 parts by mass of an acrylonitrile butadiene rubber (NBR) ("PNC-38" manufactured by JSR Corporation), 11 parts by mass of hexamethylenetetramine and 4 parts by mass of calcium stearate were blended and homogeneously mixed. Thereafter, the resulting mixture was homogeneously heat-kneaded and formed into a sheet-form material on a heated roller. After being cooled, the sheet-form material was ground in a power mill to obtain a granular molding material for a sliding member.

The resulting molding material for a sliding member was injection-molded under the following molding conditions to obtain a test piece.

Molding Condition cylinder temperature: 90° C. in the anterior part, and 40° C. in the rear part die temperature: 170° C.

curing time period: 60 sec

The processability, the sliding properties and the mechanical properties were evaluated using the resulting test pieces. The results are shown in Table 3. It is to be noted that each evaluation was made in accordance with the following method.

Processability

The degree of chipping in end-milling by means of a milling machine was determined as in the following. It is to be noted that the processing conditions involved the rotation speed of 1,000 rpm and the feed rate of 150 mm/min.

Determination: criteria

A: the maximum width of chips being less than 1 mm;

B: the maximum width of chips being no less than 1 mm and less than 4 mm; and

C: the maximum width of chips being no less than 4 mm.

Sliding Properties

As sliding properties, the wear amount of the resin, the wear amount of the counter-member, the frictional coefficient and the PV value were each determined under the following sliding conditions. It is to be noted that in Table 3, the PV value as referred to reflects a sliding test condition under which an operation of the sliding test becomes impossible due to increased frictional resistance, and specifically, a product of test contact pressure and a testing speed.

resin: a square test piece of 30 mm×30 mm×3 mm;

counter-member: a hollow cylinder having an outer diameter of 25.6 mm, an inner diameter of 20 mm, and a length of 15 mm;

material of counter-member: S45C;
test contact pressure: 4.9 MPa;
testing speed: 0.33 m/sec at the start, followed by an increase of the testing speed by an increment of 0.33 m/sec every 20 min
final measuring speed: 2.64 m/sec; and
environment: in the absence of lubrication.

Mechanical Properties

As a mechanical property, the modulus of elasticity in flexure was determined in accordance with JIS-K7171 standard.

Examples 2 to 16 and Comparative Examples 1 to 4

Molding materials for a sliding member were prepared in a similar manner to Example 1 except that the type and amount of each component blended was changed as shown in Table 2, and each molding material for a sliding member was evaluated. Details of each component used in Examples 2 to 16 and Comparative Examples 1 to 4 are shown below.

resol-type phenol resin: dimethylene ether-type phenol resin (trade name "CP701K", manufactured by Asahi Organic Chemicals Industry Co., Ltd.; number average molecular weight: 800)

glass fiber: ("CS3E227S" manufactured by Nitto Boseki Co., Ltd.)

zinc borate: ("HA-1" manufactured by Sakai Chemical Industry Co., Ltd.)

boron oxide: (manufactured by Nitto Denko Corporation)

borax: ("sodium tetraborate", manufactured by Wako Pure Chemical Industries, Ltd.)

silicone rubber: ("KMP-597" manufactured by Shin-Etsu Chemical Co., Ltd.)

slaked lime: ("Irimajiri Slaked Lime" manufactured by Irimajiri Lime Industry Co., Ltd.)

TABLE 2

| | Component | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Phenol resin | novolak-type phenol resin (1) | 100 | — | — | 100 | 100 | 100 | 100 | 100 | 100 | 100 | 100 | — |
| | novolak-type phenol resin (2) | — | 100 | — | — | — | — | — | — | — | — | — | 100 |
| | resol-type phenol resin | — | — | 100 | — | — | — | — | — | — | — | — | — |
| Filler | carbon fiber | 50 | 50 | 50 | — | 50 | 50 | 50 | 50 | 50 | 50 | 50 | 50 |
| | glass fiber | — | — | — | 50 | — | — | — | — | — | — | — | — |
| | graphite (black lead) | 100 | 100 | 100 | 100 | 100 | 100 | 100 | 100 | 100 | 100 | 100 | 100 |
| Boron compound | boric acid | 3 | 3 | 3 | 3 | — | — | — | 3 | 3 | 3 | 3 | 3 |
| | zinc borate | — | — | — | — | 3 | — | — | — | — | — | — | — |
| | boron oxide | — | — | — | — | — | 3 | — | — | — | — | — | — |
| | borax | — | — | — | — | — | — | 3 | — | — | — | — | — |
| Elastomer | FEA | 7.5 | 7.5 | 7.5 | 7.5 | 7.5 | 7.5 | 7.5 | 2.5 | 12.5 | 25 | — | 2.5 |
| | rubber | — | — | — | — | — | — | — | — | — | — | 7.5 | — |
| Proportion of elastomer to carbon fiber (%) | | 15 | 15 | 15 | | 15 | 15 | 15 | 5 | 25 | 50 | 15 | 5 |
| Other additive | hexamethylenetetramine | 11 | 11 | — | 11 | 11 | 11 | 11 | 11 | 11 | 11 | 11 | 11 |
| | calcium stearate | 4 | 4 | 3 | 4 | 4 | 4 | 4 | 4 | 4 | 4 | 4 | 4 |
| | slaked lime | — | — | 6 | — | — | — | — | — | — | — | — | — |

| | Component | Example 13 | Example 14 | Example 15 | Example 16 | Comparative Example 1 | Comparative Example 2 | Comparative Example 3 | Comparative Example 4 |
|---|---|---|---|---|---|---|---|---|---|
| Phenol resin | novolak-type phenol resin (1) | — | — | 100 | — | 100 | 100 | — | — |
| | novolak-type phenol resin (2) | 100 | 100 | — | 100 | — | — | 100 | — |
| | resol-type phenol resin | — | — | — | — | — | — | — | 100 |
| Filler | carbon fiber | 50 | 50 | 50 | 50 | 50 | — | 50 | 50 |
| | glass fiber | — | — | — | — | — | 50 | — | — |
| | graphite (black lead) | 100 | 100 | 100 | 100 | 100 | 100 | 100 | 100 |
| Boron compound | boric acid | 3 | 3 | 3 | 3 | 3 | 3 | 3 | 3 |
| | zinc borate | — | — | — | — | — | — | — | — |
| | boron oxide | — | — | — | — | — | — | — | — |
| | borax | — | — | — | — | — | — | — | — |
| Elastomer | FEA | 12.5 | 25 | 30 | 30 | — | — | — | — |
| | rubber | — | — | — | — | — | — | — | — |
| Proportion of elastomer to carbon fiber (%) | | 25 | 50 | 60 | 60 | — | — | — | — |

TABLE 2-continued

| | | | | | | | | | |
|---|---|---|---|---|---|---|---|---|---|
| Other additive | hexamethylenetramine | 11 | 11 | 11 | 11 | 11 | 11 | 11 | |
| | calcium stearate | 4 | 4 | 4 | 4 | 4 | 4 | 4 | 3 |
| | slaked lime | — | — | — | — | — | — | — | 6 |

* NBR: acrylonitrile butadiene rubber

TABLE 3

| Evaluations | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Processability | degree of chipping | A | A | A | A | A | A | B | B | A | A |
| Sliding properties | resin wear amount (mm$^3$) | 7 | 11 | 13 | 26 | 11 | 8 | 15 | 10 | 7.8 | 8.3 |
| | wear amount of counter-member (mg) | 0.4 | 0.5 | 0.8 | 2.1 | 0.4 | 0.5 | 0.6 | 0.4 | 0.5 | 0.7 |
| | frictional coefficient | 0.02 | 0.03 | 0.03 | 0.04 | 0.03 | 0.03 | 0.03 | 0.03 | 0.02 | 0.03 |
| | PV value (NPS-m/s) | 13 | 11 | 9.8 | 9.8 | 11 | 13 | 9.8 | 13 | 13 | 13 |
| Mechanical properties | modulus of elasticity in flexure (MPa) | 13000 | 12000 | 14500 | 13900 | 13600 | 12600 | 14600 | 14000 | 12300 | 11000 |

| Evaluations | | Example 11 | Example 12 | Example 13 | Example 14 | Example 15 | Example 16 | Comparative Example 1 | Comparative Example 2 | Comparative Example 3 | Comparative Example 4 |
|---|---|---|---|---|---|---|---|---|---|---|---|
| Processability | degree of chipping | A | B | A | A | A | A | C | C | C | C |
| Sliding properties | resin wear amount (mm$^3$) | 14 | 15 | 13 | 16 | 10 | 18 | 15 | 50 | 25 | 24 |
| | wear amount of counter-member (mg) | 0.7 | 0.4 | 0.6 | 0.9 | 0.9 | 1.2 | 0.8 | 3.1 | 1.0 | 1.0 |
| | frictional coefficient | 0.05 | 0.04 | 0.03 | 0.04 | 0.04 | 0.05 | 0.03 | 0.08 | 0.04 | 0.03 |
| | PV value (NPS-m/s) | 9.8 | 11 | 11 | 11 | 13 | 11 | 13 | 9.8 | 11 | 9.8 |
| Mechanical properties | modulus of elasticity in flexure (MPa) | 13800 | 15000 | 11000 | 10000 | 9800 | 9100 | 15100 | 16000 | 16300 | 18200 |

* PV value: sliding gear condition (a product of pressure and speed) under which an operation of the sliding test becomes impossible due to increased frictional resistance.

It is found from the results shown in Table 3, that when an elastomer is blended into a conventional phenol resin molding material (Comparative Example 1, Comparative Example 2, Comparative Example 3 or Comparative Example 4), the modulus of elasticity in flexure can be decreased, resulting in an improvement of the processability of the molding materials for a sliding member (Example 1/Comparative Example 1, Example 4/Comparative Example 2, Examples 2: 12 to 14 and 16/Comparative Example 3, and Example 3/Comparative Example 4). Moreover, it is found that when NBR is selected as the elastomer, the modulus of elasticity in flexure can be decreased while the superior sliding properties are maintained (Example 1/Example 11). In addition, when the amount of the elastomer added with respect to 100 parts by mass of the carbon fiber is no greater than 15 parts, the modulus of elasticity in flexure is found to be increased, resulting in deterioration of the processability (Example 1/Example 8, and Example 2/Example 12). It is presumed that this finding would result from an insufficient reduction of the rigidity of the carbon fiber because of a small amount of the elastomer added with respect to the carbon fiber. On the other hand, it is found that when the amount of the elastomer added with respect to 100 parts by mass of the carbon fiber is no less than 25 parts, the modulus of elasticity in flexure is excessively decreased, resulting in deterioration of the sliding properties (Example 9/Examples 10 and 15, Example 13/Examples 14 and 16). Moreover, it is found that when a resol-type phenol resin is used as the phenol resin, superior processability can be exhibited even though the modulus of elasticity in flexure is comparatively high (Example 3).

INDUSTRIAL APPLICABILITY

The molding material for a sliding member according to the embodiment of the present invention exhibits superior processability and sliding properties, and therefore can be suitably used as a material for use in molding sliding members. Moreover, the sliding member formed from the molding material for a sliding member exhibits superior sliding properties, and therefore can be suitably used as a sliding part for automobiles, OA instruments, and the like.

The invention claimed is:

1. A molding material for a sliding member comprising a phenol resin, a boron compound, an elastomer and a filler; and
    wherein the filler comprises a carbon fiber; and
    wherein a content of the elastomer with respect to 100 parts by mass of the carbon fiber is no less than 5 parts by mass and no greater than 50 parts by mass.

2. The molding material for a sliding member according to claim 1, wherein the elastomer comprises at least one selected from the group consisting of an acrylonitrile butadiene rubber, a urethane rubber and a silicone rubber.

3. The molding material for a sliding member according to claim 2, wherein the elastomer comprises an acrylonitrile butadiene rubber.

4. The molding material for a sliding member according to claim 1, wherein the boron compound comprises at least one selected from the group consisting of boric acid, zinc borate and boron oxide.

5. The molding material for a sliding member according to claim 1, wherein a total content of a phenolic monomer and a phenolic dimer in the phenol resin is no greater than 10% by mass, and a dispersity ratio (Mw/Mn) of a weight average molecular weight (Mw) to a number average molecular weight (Mn) of the phenol resin is no less than 1.1 and no greater than 3.0.

6. A sliding member formed from the molding material for a sliding member according to claim 1.

* * * * *